(12) United States Patent
Takeuchi et al.

(10) Patent No.: US 6,741,402 B2
(45) Date of Patent: May 25, 2004

(54) OBJECTIVE LENS FOR OPTICAL HEAD

(75) Inventors: Shuichi Takeuchi, Saitama-ken (JP);
Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/973,114

(22) Filed: Oct. 10, 2001

(65) Prior Publication Data

US 2002/0089763 A1 Jul. 11, 2002

(30) Foreign Application Priority Data

Oct. 12, 2000 (JP) ........................................ 2000-312110

(51) Int. Cl.$^7$ .............................. G02B 3/08; G02B 5/18; G02B 27/44
(52) U.S. Cl. .................... 359/719; 359/570; 359/743
(58) Field of Search ............................. 359/742, 743, 359/558–576, 719

(56) References Cited

U.S. PATENT DOCUMENTS

| | | | |
|---|---|---|---|
| 5,260,828 A | * 11/1993 | Londono et al. | 359/565 |
| 5,633,852 A | 5/1997 | Maruyama et al. | |
| 6,088,322 A | 7/2000 | Broome et al. | |
| 6,118,594 A | 9/2000 | Maruyama | |
| 6,191,889 B1 | 2/2001 | Maruyama | |
| 6,349,083 B1 | * 2/2002 | Kiriki et al. | 369/112.23 |
| 6,487,016 B1 | * 11/2002 | Shiono et al. | 359/566 |
| 2001/0008512 A1 | 7/2001 | Maruyama | |
| 2002/0003767 A1 | 1/2002 | Ota et al. | |
| 2002/0012313 A1 | 1/2002 | Kimura et al. | |

FOREIGN PATENT DOCUMENTS

| | | |
|---|---|---|
| JP | 7-311337 | 11/1995 |
| JP | 9-311271 | 12/1997 |
| JP | 11337818 | 12/1999 |
| JP | 2000-260056 | 9/2000 |
| JP | 2001-249273 | 9/2001 |
| JP | 2002-50067 | 2/2002 |
| JP | 2002-82280 | 3/2002 |

OTHER PUBLICATIONS

English Language Abstract of JP 9–311271.

* cited by examiner

*Primary Examiner*—Georgia Epps
*Assistant Examiner*—Deborah Raizen
(74) *Attorney, Agent, or Firm*—Greenblum & Bernstein, P.L.C.

(57) ABSTRACT

A single element objective lens for an optical disc drive converges a laser beam, which is emitted by a laser source, on a data recording surface of an optical disc through a protective layer of the optical disc. One surface of the objective lens is divided into a central area including an optical axis thereof and a peripheral area surrounding the central area. The peripheral area is provided with a diffraction lens structure formed by a plurality of concentric annular zones including minute steps. The central area is a continuous surface having no stepped portions. The diffraction lens structure compensates for variation of converging characteristic of the objective lens due to a change of a temperature.

14 Claims, 11 Drawing Sheets

SPHERICAL ABERRATION SA
SINE CONDITION SC

SPHERICAL ABERRATION
CHROMATIC ABERRATION

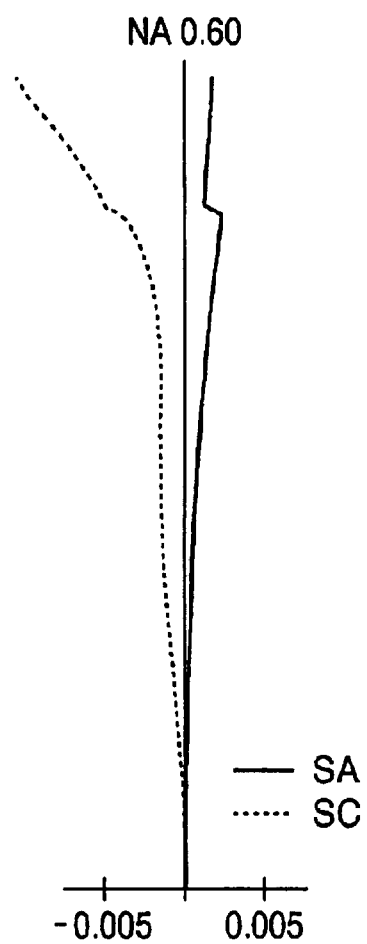
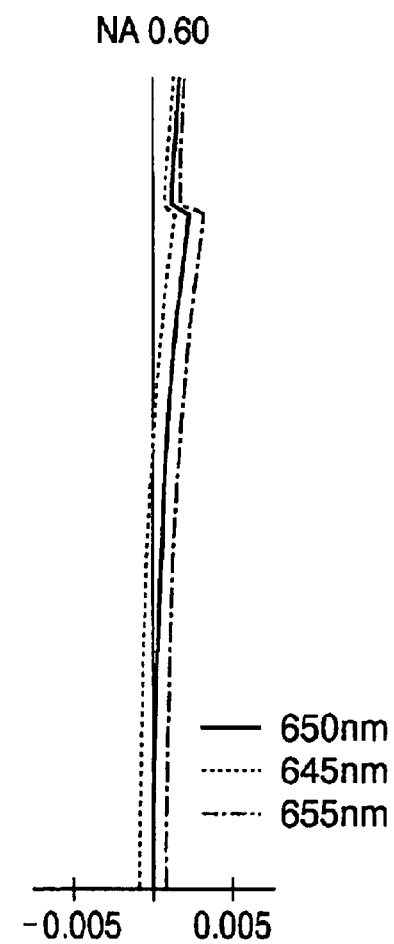

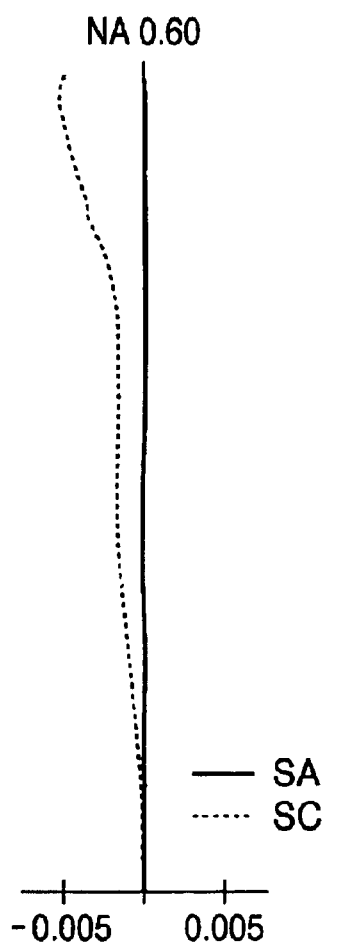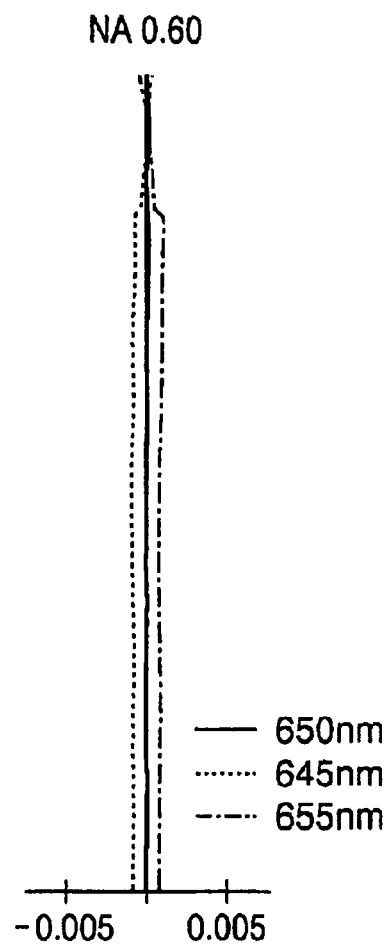

NA 0.60

—— SA
······ SC

-0.005  0.005

SPHERICAL ABERRATION SA
SINE CONDITION SC

NA 0.60

—— 650nm
······ 645nm
—·—· 655nm

-0.005  0.005

SPHERICAL ABERRATION
CHROMATIC ABERRATION

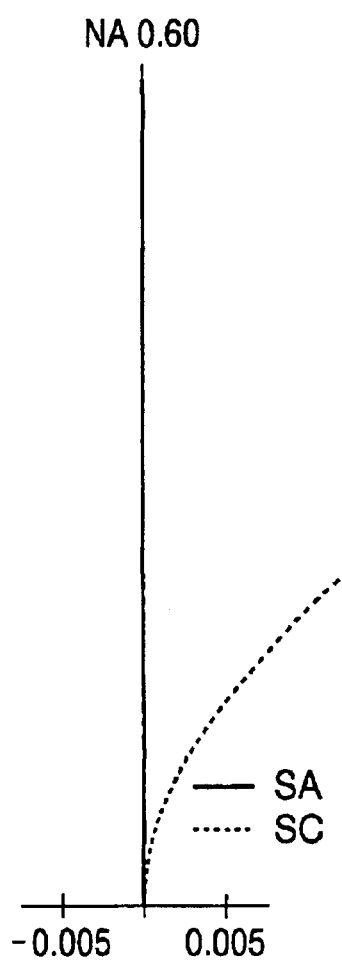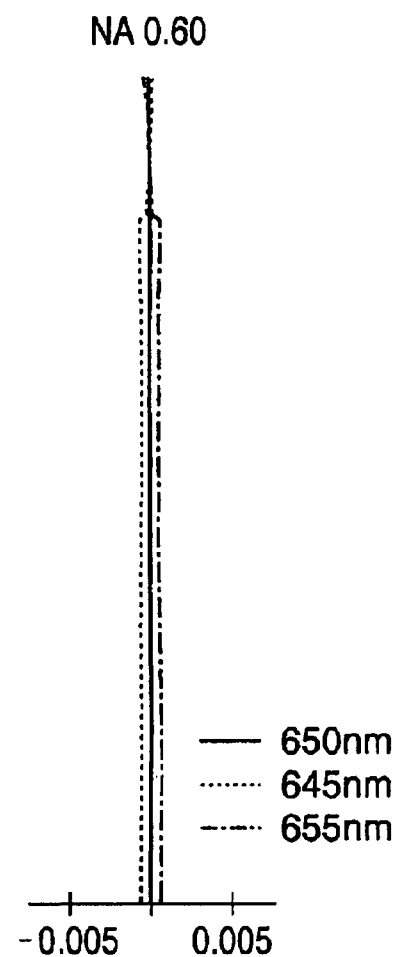

NA 0.60

— SA
······ SC

SPHERICAL ABERRATION SA
SINE CONDITION SC

NA 0.60

— 650nm
······ 645nm
-·-·- 655nm

SPHERICAL ABERRATION
CHROMATIC ABERRATION

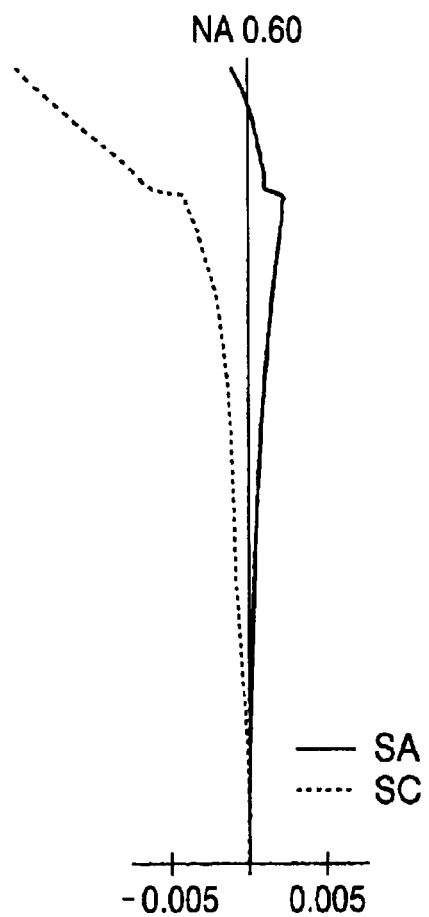
FIG.13A
FIG.13A — SPHERICAL ABERRATION SA / SINE CONDITION SC
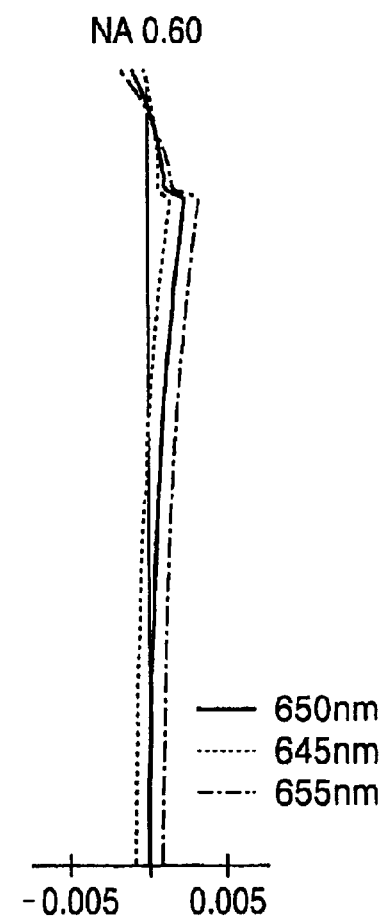
FIG.13B — SPHERICAL ABERRATION CHROMATIC ABERRATION

OBJECTIVE LENS FOR OPTICAL HEAD

BACKGROUND OF THE INVENTION

The present invention relates to a high NA objective lens typically used for an optical head of an optical disc drive, which utilizes an optical disc such as a DVD (digital versatile disc), MO (magneto-optical) disc, or the like.

Recently, in order to meet a requirement of decreasing in size and weight of optical disc drives, plastic objective lenses, both surfaces of which are formed as aspherical surfaces, have been used in optical heads for such optical disc drives.

Although the plastic lenses have various advantages, the refractive index and/or shape of a plastic lens may easily be changed depending on changes in temperature in comparison with those of a glass lens, and due to this variable characteristics, performance of the plastic lens may vary. For example, when the temperature increases, the refractive index of a plastic lens decreases. Then, a spherical aberration of the plastic lens changes in an over-corrected direction, and a wavefront aberration increases. Generally, a ratio of the change of the refractive index of a plastic lens with respect to the change of the temperature is approximately $-11 \times 10^{-5}/°$ C. Accordingly, when the objective lens of an optical head is formed with a plastic lens, the above characteristics may affect the performance of the optical head.

TABLE 1 shows the wavefront aberration (rms value, unit of which is $\lambda$: wavelength) using an NA (numerical aperture) as a parameter when the temperature is raised by 40 degrees (i.e., the refractive index is changed by $-440 \times 10^{-5}$) for a plastic lens having a focal length of 3.0 mm, working wavelength of which is 650 nm. FIG. 16 is a graphical representation of the data of TABLE 1.

TABLE 1

| NA | wavefront aberration (rms value, unit:$\lambda$) |
|---|---|
| 0.00 | 0.000 |
| 0.10 | 0.000 |
| 0.20 | 0.001 |
| 0.30 | 0.003 |
| 0.40 | 0.007 |
| 0.50 | 0.018 |
| 0.60 | 0.043 |

Generally, the objective lens for a CD drive is designed such that the NA is approximately 0.45 and the upper limit of an allowable range of the wavefront aberration is 0.04$\lambda$. Therefore, even if the temperature is changed by about 90 degrees, the wavefront aberration stays within the allowable range. Accordingly, for the objective lens for the CD drive, the variation of the wavefront aberration does not practically affect the performance of the objective lens.

The objective lenses for a DVD drive is generally designed such that the NA is approximately 0.60. The objective lens for an MO disc drive is designed such that the NA is approximately 0.55. The upper limit of the allowable range of the wavefront aberration for such lenses is approximately 0.03$\lambda$. Therefore, when the temperature changes by 40 through 50 degrees, the wavefront aberration exceeds the upper limit of the allowable range, which may likely affect data recording/readout operation.

SUMMARY OF THE INVENTION

It is therefore an object of the invention to provide an improved objective lens for an optical head, the wavefront aberration of which due to the variation of the temperature is well suppressed, and is applicable, as a high NA objective lens, to the DVD drive or MO disc drive at a relatively wide usable temperature range.

For the above object, according to an aspect of the invention, there is provided a single element objective lens for an optical disc drive. The objective lens converges a laser beam, which is emitted by a laser source, on a data recording surface of an optical disc through a protective layer of the optical disc. One surface of the objective lens is divided into a central area including an optical axis of the objective lens and a peripheral area surrounding the central area. The central area is formed as a continuous surface having no stepped portions, while the peripheral area is provided with a diffraction lens structure formed by a plurality of concentric annular zones including minute steps. Further, the diffraction lens structure is configured to compensate for variation of converging characteristic of the objective lens due to a change of a temperature.

By providing the diffraction lens structure as described above, the affect of the temperature variation can be avoided. It should be noted that, in practical use, the diffraction lens structure may be provided only in the peripheral area, and the variation of the converging characteristic can be suppressed in an allowable range.

Preferably, area of the peripheral area is not greater than area of the central area. If the peripheral area becomes greater than the central area, the wavelength dependence of the spherical aberration may become too great, and the performance of the objective lens may be worsened due to individual differences of wavelengths among laser sources.

Optionally, the diffraction lens structure has a characteristic such that the spherical aberration thereof changes in an under corrected direction when a wavelength of the laser beam incident on the objective lens increases.

It should be noted that, if the objective lens is formed of plastic, the refractive index of which is lowered when the temperature increases. On the other hand, a wavelength of the laser beam increases when the temperature increases. Therefore, due to a balance between the change of the spherical aberration of the refractive lens due to the change of the temperature and the change of the spherical aberration of the diffraction lens structure due to the change of the wavelength, which is caused by the change of the temperature, the variation of the converging characteristic of the objective lens due to the temperature change can be compensated.

According to another aspect of the invention, there is provided a single element objective lens for an optical disc drive, the objective lens converging a laser beam emitted by a laser source on a data recording surface of an optical disc through a protective layer of the optical disc. One surface of the objective lens is divided into a central area including an optical axis of the objective lens and a peripheral area surrounding the central area. A diffraction lens structure formed by a plurality of concentric annular zones including minute steps is provided only in the peripheral area. The diffraction lens structure is configured to compensate for variation of converging characteristic of the objective lens due to a change of a temperature.

Optionally, the objective lens is formed of plastic, refractive index of which is lowered when the temperature increases. Further, a wavelength of the laser beam increases when the temperature increases.

According to another aspect of the invention, there is provided an optical system of an optical head for an optical disc drive, including a laser source unit that emits a laser beam, and a single element objective lens that converges a laser beam emitted by the laser source unit on a data recording surface of an optical disc through a protective layer of the optical disc. One surface of the objective lens is divided into a central area including an optical axis of the objective lens and a peripheral area surrounding the central area. The peripheral area is provided with a diffraction lens structure formed by a plurality of concentric annular zones including minute steps. The diffraction lens structure is configured to compensate for variation of converging characteristic of the objective lens due to a change of a temperature.

Optionally, the laser source unit is configured to selectively emit one of a first laser beam and a second laser beam, a wavelength of the second laser beam being longer than a wavelength of the first laser beam. The second laser beam is incident on the objective lens as a diverging beam, while the first laser beam is incident on the objective lens as a beam having less divergence than the second laser beam. The objective lens converges the first laser beam on a data recording surface of a first optical disc through a first protective layer of the first optical disc. Further the objective lens converges the second laser beam on a data recording surface of a second optical disc through a second protective layer of the second optical disc. A data density of the first optical disc is higher than a data density of the second optical disc, while a thickness of the first protective layer is smaller than a thickness of the second protective layer.

It should be noted that a wavelength of the laser beam emitted by the laser source unit may increase when the temperature increases, while the objective lens is formed of plastic and the refractive index is lowered when the temperature increases.

In this case, the diffraction lens structure is configured to have a characteristic in terms of a spherical aberration such that the spherical aberration changes in an under corrected direction when a wavelength of the laser beam incident on said objective lens increases.

BRIEF DESCRIPTION OF THE ACCOMPANYING DRAWINGS

FIG. 1 schematically shows a structure of an optical system for an optical head, according to a first embodiment of the invention;

Figure 3:
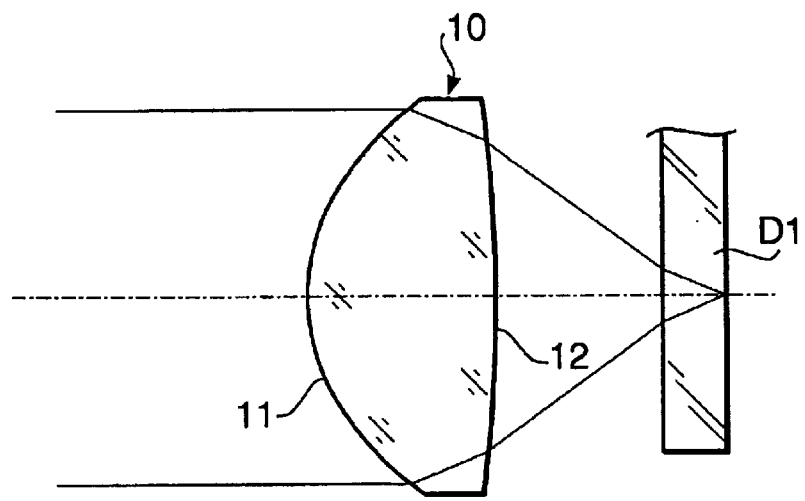
Figure 4A:
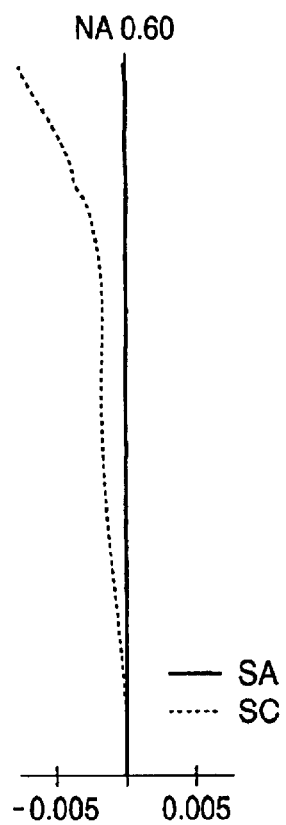
Figure 4B:
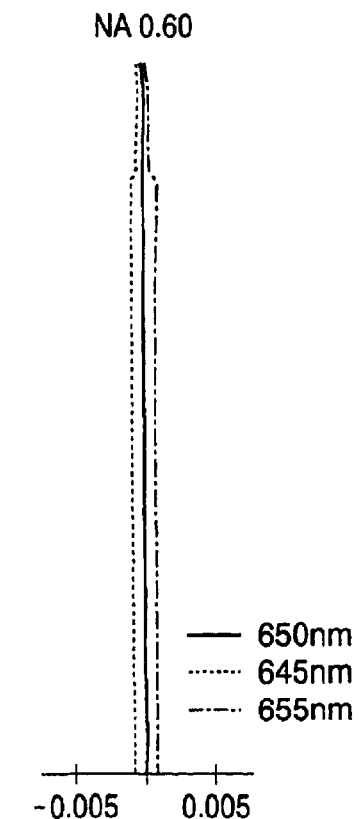
Figure 7A:
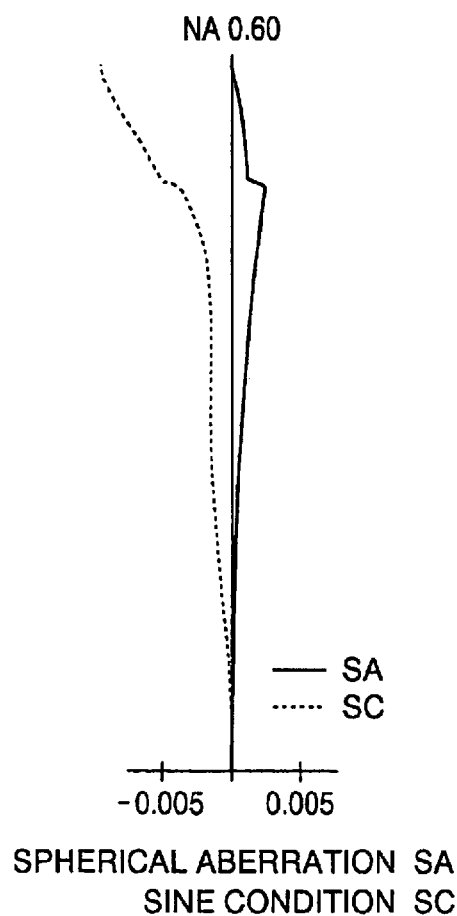
Figure 7B:
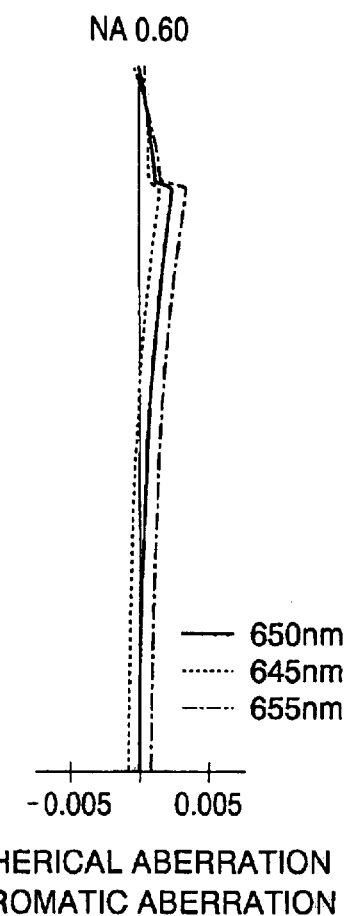
Figure 8:
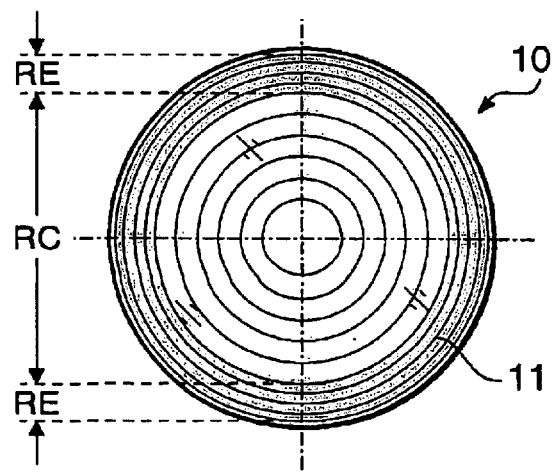
Figure 10A:
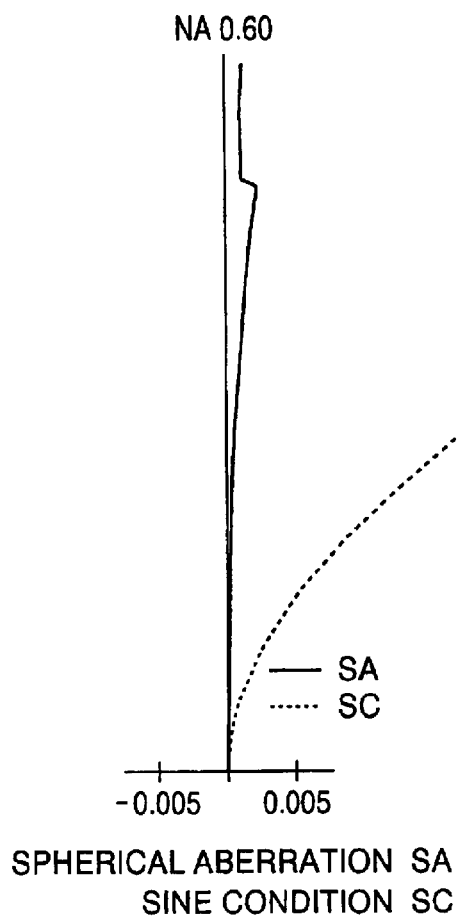
Figure 10B:
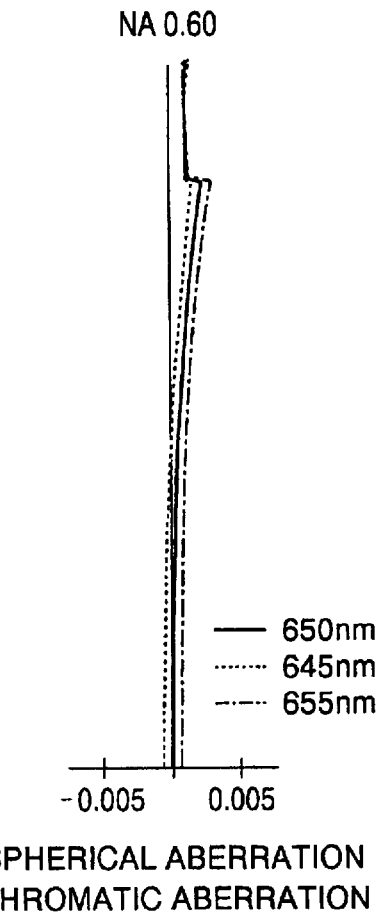
Figure 11:
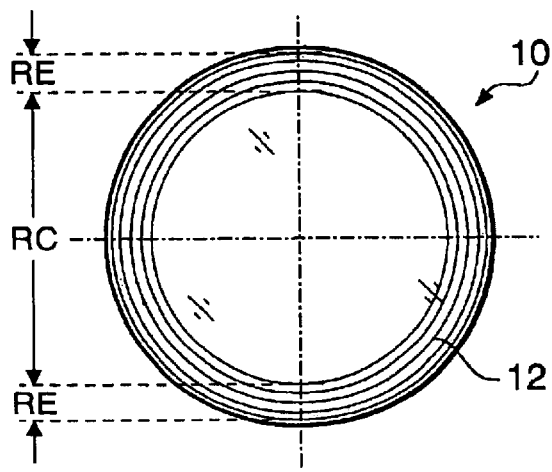
Figure 12A:
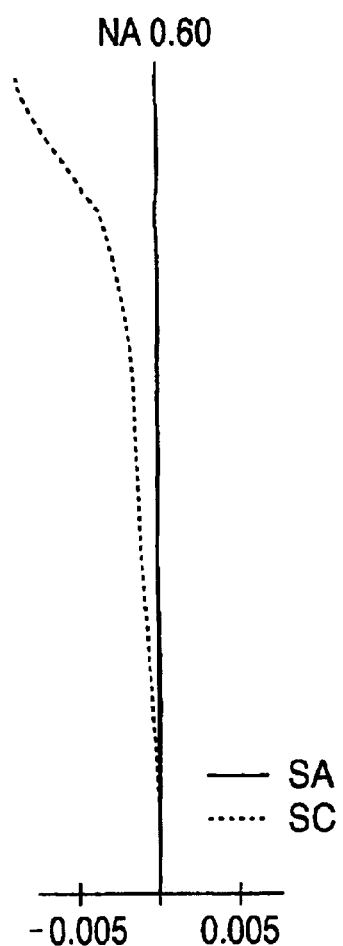
Figure 12B:
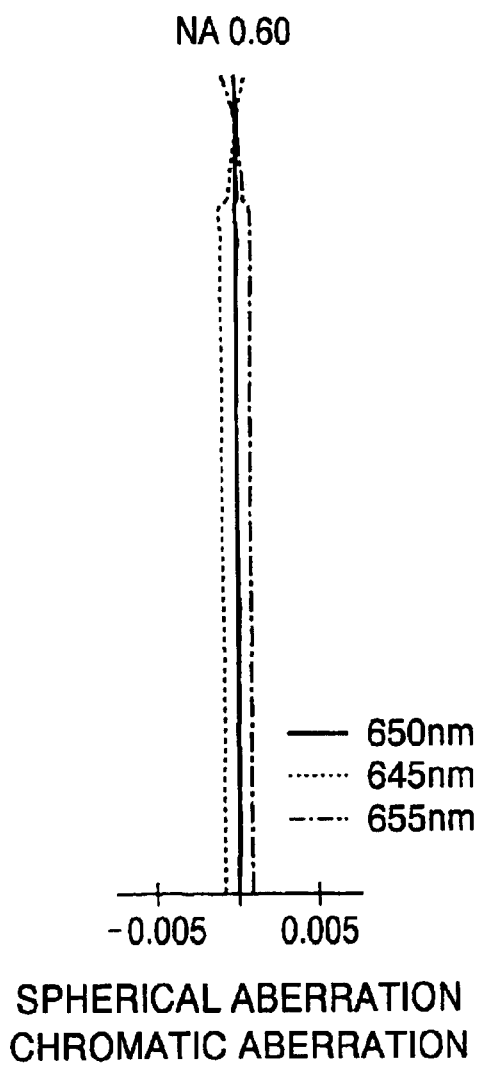
Figure 14:
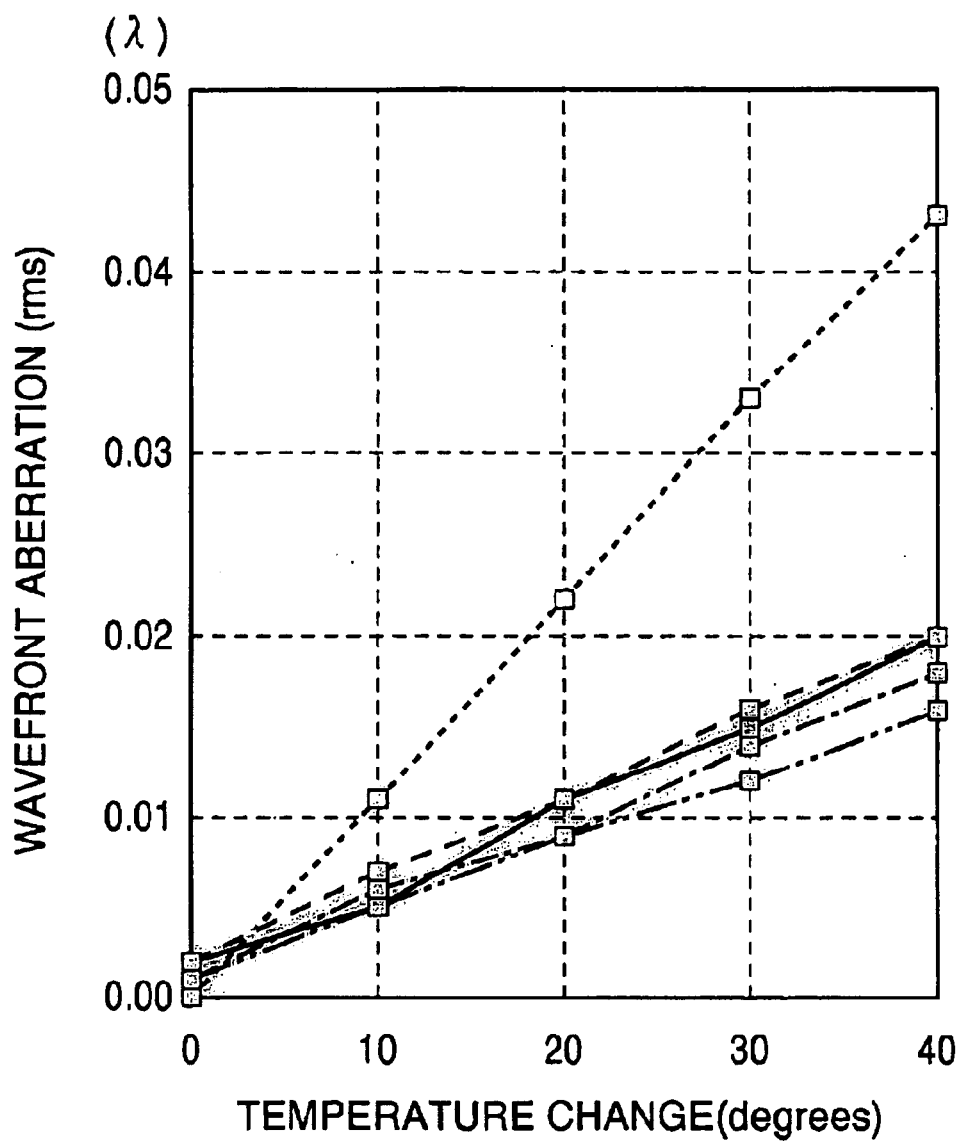
Figure 15:
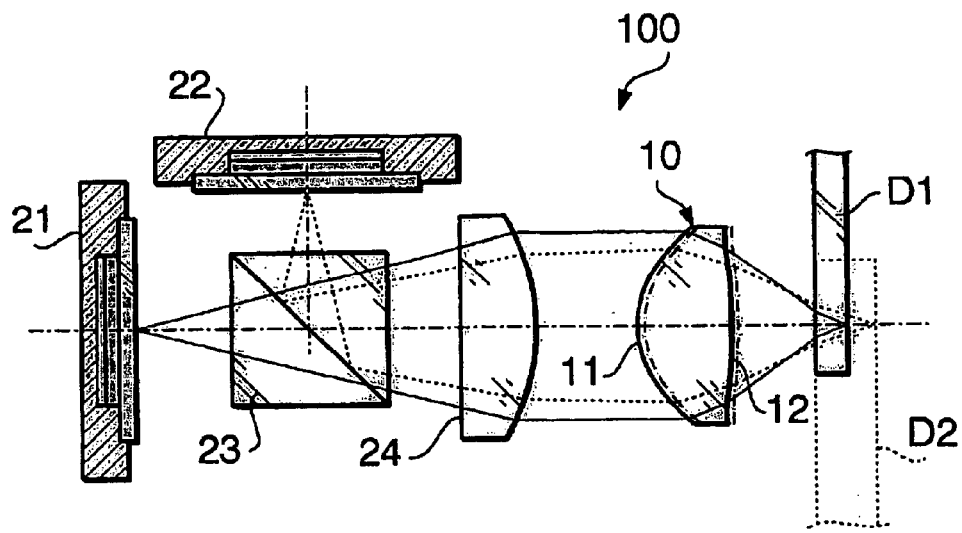
Figure 16:
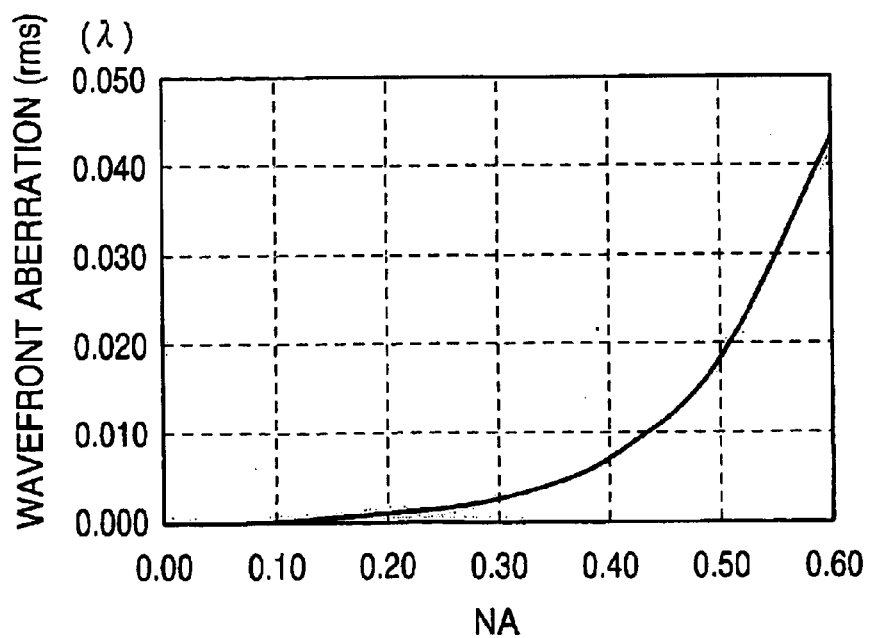

FIG. 3 schematically shows an arrangement of an objective lens and an optical disc according to a first embodiment;

FIGS. 4A and 4B are graphs respectively showing spherical aberration and chromatic aberration of the objective lens according to the first embodiment when the first optical disc is used;

FIGS. 5A and 5B are graphs respectively showing spherical aberration and chromatic aberration when the refractive index of the objective lens according to the first embodiment is lowered by 0.0044;

FIGS. 6A and 6B are graphs respectively showing spherical aberration and chromatic aberration according to the second embodiment, when a first optical disc is used;

FIGS. 7A and 7B are graphs respectively showing spherical aberration and chromatic aberration when the refractive index of the objective lens according to the second embodiment is lowered by 0.0044;

FIG. 8 shows a front view of an objective lens according to a third embodiment;

FIGS. 9A and 9B are graphs respectively showing spherical aberration and chromatic aberration of the objective lens according to the third embodiment when the first optical disc is used;

FIGS. 10A and 10B are graphs respectively showing spherical aberration and chromatic aberration when the refractive index of the objective lens according to the third embodiment is lowered by 0.0044;

FIG. 11 shows a rear view of an objective lens according to a fourth embodiment;

FIGS. 12A and 12B are graphs respectively showing spherical aberration and chromatic aberration of the objective lens according to the fourth embodiment when the first optical disc is used;

FIGS. 13A and 13B are graphs respectively showing spherical aberration and chromatic aberration when the refractive index of the objective lens according to the fourth embodiment is lowered by 0.0044;

FIG. 14 is a graph showing the change of the wavefront aberration with respect to the temperature change, for the embodiments and a comparative objective lens;

FIG. 15 schematically shows a structure of an optical system of an optical head according to the second embodiment; and FIG. 16 is a graph showing a change of the wavefront aberration when the temperature increases 40 degrees using the NA as a parameter, for a plastic lens having a focal length of 3.0 mm designed for the light having a wavelength of 650 nm.

DESCRIPTION OF THE EMBODIMENTS

Hereinafter, optical systems for an optical head according to the present invention will be described with reference to the accompanying drawings.

Firstly, an overall structure of an optical system will be described, and then, objective lenses according to respective embodiments will be described.

Figure 1:
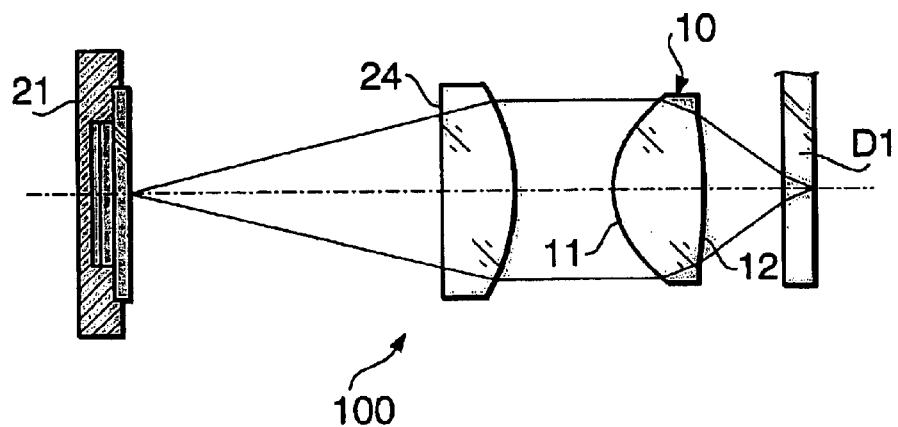

An optical system 100 of an optical head according to a first embodiment of the invention is shown in FIG. 1. The optical system 100 is used for an optical disc drive for performing data recording/readout on optical discs (hereinafter, referred to as a first disc) having a relatively high density such as the DVD.

The optical system 100 includes a laser module 21 (hereinafter, referred to as a first laser module), a collimating lens 24, and an objective lens 10.

The first laser module 21 is a device provided with a laser diode and a photo sensor integrally.

The objective lens 10 is configured to be movable in a direction of its optical axis with a well-known focusing mechanism. Further, the objective lens 10 is also movable in a radial direction of the optical disc with a well-known tracking mechanism.

The objective lens is employed in an optical head (not shown) for an optical disc drive (not shown), which performs data recording/readout on a first optical disc D1 (e.g., DVD) having a high data recording density and a relatively thin protective layer (0.6 mm).

In order to use a first optical disc D1, a red light beam, whose wavelength is within a range from 635 nm to 665 nm, is required in order to form a sufficiently small beam spot on the data recording surface of the first optical disc D1. Thus, the first laser module 21 is provided with a laser diode which emits a laser beam having a wavelength of 650 nm.

The first laser module 21 is arranged such that a first laser beam emerging from the collimating lens 24 is incident on the objective lens 10 as parallel light fluxes, i.e., the light emitting point thereof coincides with a front focal point of the collimating lens 24 so that an object distance of the objective lens 10 is infinity.

The first laser beam (wavelength: 650 nm) emitted by the laser diode of the first laser module 21 is incident on the objective lens 10 and converged by the objective lens 10 to form a beam spot on the data recording surface of the first optical disc D1.

The laser beam reflected by the first optical disc D1 is received by the photo sensor included in the first laser module 21. Based on the output of the photo sensor, a focusing error signal, a tracking error signal and, when data is read out, data reproducing signal are detected.

Figures 2A, 2B, 2C:
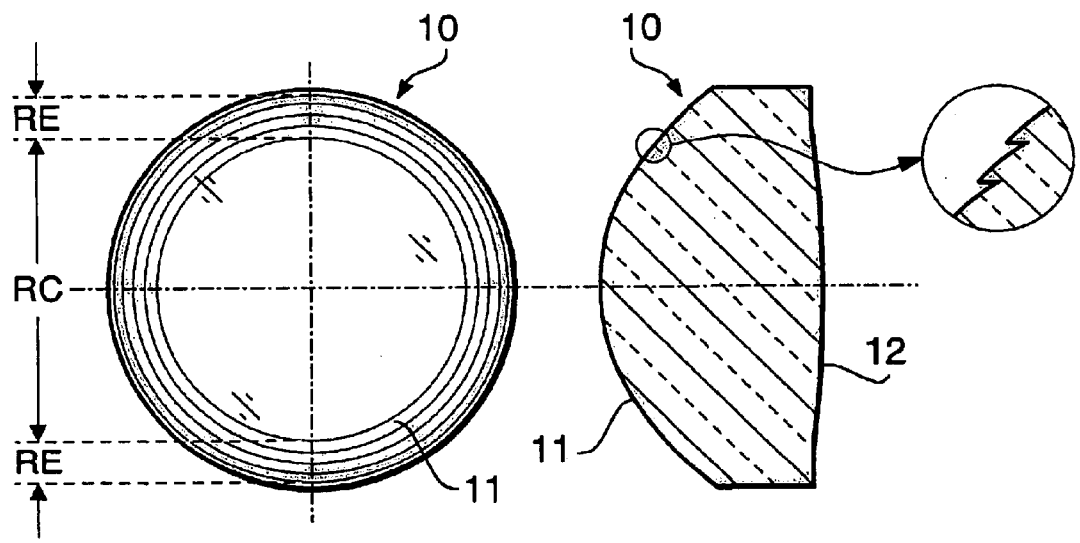
FIG. 2A is a front view of an objective lens of the optical system.
FIG. 2B is a cross sectional side view of the objective lens shown in FIG. 2A.
FIG. 2C is a partially enlarged cross sectional side view of the objective lens shown in FIG. 2A.

FIGS. 2A–2C show the structure of the objective lens 10. FIG. 2A is a front view, FIG. 2B is a cross sectional side view and FIG. 2C is a partially enlarged cross sectional side view of the objective lens 10.

The objective lens 10 is a biconvex plastic lens having first and second aspherical surfaces 11 and 12. The first surface 11 is divided into a central area RC including the optical axis and a peripheral area RE that is on the outer (i.e., peripheral) side of the central area RC. A ratio of an area of the peripheral area RE to an area of the central area RC is smaller than one. That is, the area of the peripheral area is smaller than the area of the central area RC.

On the first surface 11, within the peripheral area RE, a diffraction lens structure including a plurality of stepped concentric annular zones, as shown in FIGS. 2A and 2C, is formed. The stepped portions (i.e., the boundaries between adjacent annular zones) extend in the direction parallel with the optical axis. The central area RC of the first surface 11, and the second surface 12 are continuous surfaces, respectively, and are not formed with such diffraction lens structures having stepped portions.

The diffraction lens structure formed in the peripheral area RE is configured such that variation of the converging characteristic due to the change of the temperature is compensated. Specifically, the diffraction lens structure is configured such that the spherical aberration thereof is changed to a under corrected direction when the wavelength of the light incident thereon increases.

The spherical aberration of the refractive lens is changed in the over corrected direction when the temperature increases. Further, the wavelength of the laser beam emitted by the laser diode changes at a ratio of approximately 0.2 nm/° C. Therefore, if the temperature increases by 40 degrees, the wavelength of the laser beam increases by 8 nm.

Thus, by forming the diffraction lens structure to have the above characteristics, i.e., the spherical aberration changes in the under corrected direction when the wavelength increases, the change of the spherical aberration in the over corrected direction of the refractive lens can be compensated by the change of the diffraction lens structure in the under corrected direction due to the change of the wavelength caused by the increase of the temperature.

It should be noted that, in the above-described configuration, the diffraction lens structure is formed only in the peripheral area on the first surface 11. However, the invention is not limited to such a configuration, and various modification can be made. For example, if the objective lens 10 is used both for the DVD and CD, another diffraction lens structure may be formed on the central area RC to compensate for a chromatic aberration. Optionally or alternatively, the diffraction lens structure may be formed on the second surface 12 instead of the first surface 11.

Numerical Embodiments

Hereinafter, four numerical embodiments will be indicated.

First Embodiment

FIG. 3 schematically shows an objective lens according to a first numerical embodiment. In FIG. 3, the objective lens 10 and the first optical disc D1 are shown. The laser beam is incident on the objective lens 10 as parallel light fluxes (i.e., the object distance is infinity), and is converged on the data recording surface of the first optical disc D1. The numerical values are indicated in TABLE 2.

In the first embodiment, the first surface 11 is divided into the central area RC and the peripheral area RE. The central area RC is defined as an area where $0 \leq h < 1.50$ (mm), and the peripheral area RE is defined as an area where $1.50 \leq h$, wherein h represents a height with respect to the optical axis of the objective lens 10. The central area RC is a continuous surface without stepped portions, and the peripheral area RE is formed with a diffraction lens structure, which varies the spherical aberration depending on the wavelength of the light passed therethrough.

The curvature of the central area RC and the base curve (the shape thereof as a refractive lens without the diffraction lens structure) of the peripheral area RE are different aspherical surfaces respectively defined by different coefficients. The second surface 12 is a rotationally symmetrical aspherical surface, which is not formed with a diffraction lens structure.

The central area RC and the base curve of the peripheral area RE of the first surface 11 are also rotationally symmetrical aspherical surfaces. Generally, a rotationally symmetrical aspherical surface is expressed by the following equation:

$$X(h) = \frac{ch^2}{1 + \sqrt{1 - (1+K)c^2h^2}} + A_4h^4 + A_6h^6 + A_8h^8 + A_{10}h^{10} + A_{12}h^{12}$$

where,

X(h) is a SAG, that is, a distance of a point on a surface, whose height from the optical axis is h, with respect a plane tangential at the optical axis;

Symbol c represents a curvature (1/r) of the vertex of the surface;

K is a conical constant; and $A_4, A_6, A_8, A_{10}$ and $A_{12}$ are aspherical surface coefficients of fourth, sixth, eighth, tenth and twelfth orders, respectively.

An additional optical path length φ(h), which is added by the diffractive lens structure, is expressed by the following optical path difference function:

$$\phi(h) = (P_2h^2 + P_4h^4 + P_6h^6 + \ldots) \times m \times \lambda$$

where, $P_2, P_4$ and $P_6$ are coefficients of second, fourth and sixth orders;

h represents a height from the optical axis;

m represents a diffraction order; and

λ represents a working wavelength. The optical path difference φ(h) indicates a difference between an optical path length of a hypothetical ray of light which does not pass through the diffractive lens structure and an optical path length of a ray of light which is diffracted by the diffraction lens structure, at the height h from the optical axis. In other words, the optical path difference φ(h) represents the additional optical path length of each ray of light which is diffracted by the diffractive lens structure. The positive sign of the added length represents that the optical path length on the optical axis is elongated relative to the optical path length on the optical axis.

An actual microscopic shape of the diffractive lens structure is defined by subtracting λ×k (k: integer), i.e., an integral multiple of λ, from φ(h) to have a stepwise additional optical path length φ'(h), similar to the Fresnel lens. Specifically, the additional optical path length φ'(h) is expressed by the following formula.

$$\phi'(h) = (MOD(P_2h^2 + P_4h^4 + P_6h^6 + \ldots + CONST, 1) - CONST) \times \lambda_B$$

where, MOD is a modulo function, and $\lambda_B$ is a blazed wavelength, at which an optical path length difference generated by the minute step of the diffractive lens structure becomes equal to one wavelength, i.e., diffraction efficiency is maximized. The constant CONST defines a phase of a boundary between the annular zones and could be an arbitrary value satisfying a condition: $0 \leq CONST < 1$. It should be noted that the modulo function MOD (x, y) represents a remainder when x is divided by y.

When MOD $(P_2h^2 + P_4h^4 + P_6h^6 + \ldots + CONST, 1)$ is equal to zero, a position at the height h, from the optical axis, represents the position of the boundary between two annular zones.

In TABLE 2, coefficients defining the central area RC, the base curve of the peripheral area RE, and the diffraction lens structure, distances between surface, refractive index for d-line, Abbe number vd, coefficients defining the aspherical shape of the second surface 12 are indicated.

In TABLE 2, $NA_1$, $f_1$, $\lambda_1$, $WD_1$ and $OD_1$ are the numerical aperture, the focal length of the objective lens 10 (unit: mm), the wavelength (unit: nm), the working distance (unit: mm), the object distance (unit: mm) when the first disc D1 is used, respectively.

TABLE 2

$NA_1 = 0.60\ f_1 = 3.00\ \lambda_1 = 650\ WD_1 = 1.61\ OD_1 = \infty$

| | First surface | | |
|---|---|---|---|
| | central area ($0 \leq h < 1.50$) | peripheral area ($1.50 \leq h$) | Second surface |
| r | 1.870 | 1.832 | −8.109 |
| κ | −0.500 | −0.500 | 0.00 |
| $A_4$ | $-2.12 \times 10^{-4}$ | $-3.44 \times 10^{-3}$ | $1.68 \times 10^{-2}$ |
| $A_6$ | $1.47 \times 10^{-4}$ | $7.80 \times 10^{-4}$ | $-2.57 \times 10^{-3}$ |
| $A_8$ | $-8.23 \times 10^{-5}$ | $-7.67 \times 10^{-4}$ | $2.20 \times 10^{-4}$ |
| $A_{10}$ | $6.09 \times 10^{-5}$ | $2.96 \times 10^{-4}$ | $-1.68 \times 10^{-4}$ |
| $A_{12}$ | $-1.92 \times 10^{-5}$ | $-5.07 \times 10^{-5}$ | $2.93 \times 10^{-5}$ |
| $P_2$ | — | 4.61 | — |
| $P_4$ | — | −2.12 | — |
| $P_6$ | — | 0.00 | — |
| $P_8$ | — | 0.00 | — |
| $P_{10}$ | — | 0.00 | — |
| $P_{12}$ | — | 0.00 | — |
| d (distance between first and second surfaces) | | | 1.80 |

TABLE 2-continued $NA_1 = 0.60\ f_1 = 3.00\ \lambda_1 = 650\ WD_1 = 1.61\ OD_1 = \infty$

| | First surface | | |
|---|---|---|---|
| | central area ($0 \leq h < 1.50$) | peripheral area ($1.50 \leq h$) | Second surface |
| nd (refractive index of objective lens) | | | 1.5436 |
| vd (Abbe number of objective lens) | | | 55.7 |
| nd (refractive index of optical disc) | | | 1.5855 |
| vd (Abbe number of optical disc) | | | 29.9 |

FIG. 4A shows a spherical aberration SA and a sine condition SC of the objective lens according to the first embodiment, with respect to the first optical disc D1, at the wavelength of 650 nm. FIG. 4B shows chromatic aberrations represented by spherical aberrations at wavelengths of 650 nm, 645 nm and 655 nm. The horizontal axis of each graph represents the occurrence of the aberration (unit: mm), and the vertical axis represents the numerical aperture NA.

When the first optical disc D1 is used, the first laser beam (wavelength: 650 nm) is made incident on the objective lens 10 as parallel light (object distance: ∞). In this case, the high NA exclusive area RE functions to compensate for the aberration. Therefore, part of the laser beam passed through the common area RC and the part of the laser beam passed through the high NA exclusive area RE converge at a single point to form a beam spot, which is sufficiently small for data recording/readout on the first disc D1.

FIG. 5A shows a spherical aberration SA and a sine condition SC of the objective lens which is similar to the objective lens 10 indicated in TABLE 2 except that the refractive index is lowered by 0.0044. This change of the refractive index corresponds to the increase of the temperature by 40 degrees. When the refractive index decreases due to the increase of the temperature, the spherical aberration SA changes in the over-corrected direction as the NA increases. However, the characteristic returns in the under corrected direction at a boundary between the central area and the peripheral area, occurrence of the spherical aberration in the peripheral area can be suppressed. It should be noted that if the diffraction lens structure is not provided, the spherical aberration monotonously increases in the over corrected direction as the NA increases, and thus, the amount of the spherical aberration occurred in the peripheral area RE is too large.

Second Embodiment

TABLE 3 indicates numerical structure of an objective lens 10. The configuration of the second embodiment is substantially the same as the first embodiment except for the structure in the peripheral area RE.

TABLE 3

$NA_1 = 0.60\ f_1 = 3.00\ \lambda_1 = 650\ WD_1 = 1.61\ OD_1 = \infty$

| | First surface | | |
|---|---|---|---|
| | central area ($0 \leq h < 1.50$) | peripheral area ($1.50 \leq h$) | Second surface |
| r | 1.870 | 1.870 | −8.109 |
| κ | −0.500 | −0.500 | 0.00 |
| $A_4$ | $-2.12 \times 10^{-4}$ | $2.36 \times 10^{-3}$ | $1.68 \times 10^{-2}$ |
| $A_6$ | $1.47 \times 10^{-4}$ | $-5.50 \times 10^{-4}$ | $-2.57 \times 10^{-3}$ |
| $A_8$ | $-8.23 \times 10^{-5}$ | $-5.23 \times 10^{-4}$ | $2.20 \times 10^{-4}$ |
| $A_{10}$ | $6.09 \times 10^{-5}$ | $2.12 \times 10^{-4}$ | $-1.68 \times 10^{-4}$ |
| $A_{12}$ | $-1.92 \times 10^{-5}$ | $-4.20 \times 10^{-5}$ | $2.93 \times 10^{-5}$ |

TABLE 3-continued

NA$_1$ = 0.60 f$_1$ = 3.00 λ$_1$ = 650 WD$_1$ = 1.61 OD$_1$ = ∞

| | First surface | | |
|---|---|---|---|
| | central area (0 ≦ h < 1.50) | peripheral area (1.50 ≦ h) | Second surface |
| P$_2$ | — | 0.00 | — |
| P$_4$ | — | 2.25 | — |
| P$_6$ | — | −1.03 | — |
| P$_8$ | — | 0.00 | — |
| P$_{10}$ | — | 0.00 | — |
| P$_{12}$ | — | 0.00 | — |
| d (distance between first and second surfaces) | | 1.80 | |
| nd (refractive index of objective lens) | | 1.5436 | |
| vd (Abbe number of objective lens) | | 55.7 | |
| nd (refractive index of optical disc) | | 1.5855 | |
| vd (Abbe number of optical disc) | | 29.9 | |

FIG. 6A shows a spherical aberration SA and a sine condition SC of the objective lens according to the second embodiment, with respect to the first optical disc D1, at the wavelength of 650 nm. FIG. 6B shows chromatic aberrations represented by spherical aberrations at wavelengths of 650 nm, 645 nm and 655 nm.

FIGS. 7A and 7B show the aberrations similar to those shown in FIGS. 6A and 6B, respectively, when the refractive index of the resin forming the objective lens is lowered by 0.0044. When the temperature increases and thereby the refractive index decreases, the spherical aberration SA changes, as shown in FIG. 7A, on the over corrected side in the central area RC as the NA increases. However, the spherical aberration SA is changed in the under corrected side in the vicinity of the boundary between the central area RC and the peripheral area RE, and then changes in the under corrected direction in the peripheral area as the NA increases. As a result, with this configuration, the occurrence of the spherical aberration in the peripheral area RE can be suppressed.

Third Embodiment

FIG. 8 shows a front view of an objective lens 10 according to a third embodiment. Similarly to the first and second embodiments, the first surface 11 of the objective lens 10 is divided into the central area RC (0≦h<1.50) and the peripheral area RE (1.50≦h). In the peripheral area RE, a diffraction lens structure which varies the spherical aberration depending on the wavelength of the light passing therethrough is formed. Further to the above, according to the third embodiment, another diffraction lens structure is formed in the central area RC to compensate for a chromatic aberration. The second surface 12 of the objective lens 10 is a rotationally symmetrical aspherical surface without a diffraction lens structure.

TABLE 4 indicates a numerical structure of the objective lens 10 according to the third embodiment.

TABLE 4

NA$_1$ = 0.60 f$_1$ = 3.00 λ$_1$ = 650 WD$_1$ = 1.63 OD$_1$ = ∞

| | First surface | | |
|---|---|---|---|
| | Central area (0 ≦ h < 1.50) | Peripheral area (1.50 ≦ h) | Second surface |
| r | 1.935 | 1.926 | −7.075 |
| κ | −0.500 | −0.500 | 0.00 |
| A$_4$ | −5.14 × 10$^{-4}$ | 7.55 × 10$^{-4}$ | 2.61 × 10$^{-2}$ |

TABLE 4-continued

NA$_1$ = 0.60 f$_1$ = 3.00 λ$_1$ = 650 WD$_1$ = 1.63 OD$_1$ = ∞

| | First surface | | |
|---|---|---|---|
| | Central area (0 ≦ h < 1.50) | Peripheral area (1.50 ≦ h) | Second surface |
| A$_6$ | 6.75 × 10$^{-4}$ | 3.00 × 10$^{-6}$ | −7.19 × 10$^{-3}$ |
| A$_8$ | −1.36 × 10$^{-4}$ | −3.27 × 10$^{-4}$ | 4.83 × 10$^{-4}$ |
| A$_{10}$ | 4.17 × 10$^{-5}$ | 8.90 × 10$^{-5}$ | 7.91 × 10$^{-5}$ |
| A$_{12}$ | −2.00 × 10$^{-5}$ | −2.68 × 10$^{-5}$ | −1.50 × 10$^{-5}$ |
| P$_2$ | −2.00 | −9.97 × 10$^{-1}$ | — |
| P$_4$ | −1.54 | −3.60 × 10$^{-1}$ | — |
| P$_6$ | 3.70 × 10$^{-1}$ | −4.00 × 10$^{-1}$ | — |
| P$_8$ | 0.00 | 0.00 | — |
| P$_{10}$ | 0.00 | 0.00 | — |
| P$_{12}$ | 0.00 | 0.00 | — |
| d (distance between first and second surfaces) | | 1.80 | |
| nd (refractive index of objective lens) | | 1.5436 | |
| vd (Abbe number of objective lens) | | 55.7 | |
| nd (refractive index of optical disc) | | 1.5855 | |
| vd (Abbe number of optical disc) | | 29.9 | |

FIG. 9A shows a spherical aberration SA and a sine condition SC of the objective lens according to the third embodiment, with respect to the first optical disc D1, at the wavelength of 650 nm. FIG. 9B shows chromatic aberrations represented by spherical aberrations at wavelengths of 650 nm, 645 nm and 655 nm.

FIGS. 10A and 10B show the aberrations similar to those shown in FIGS. 9A and 9B, respectively, when the refractive index of the resin forming the objective lens is lowered by 0.0044. When the temperature increases and thereby the refractive index decreases, the spherical aberration SA changes, as shown in FIG. 10A, on the over corrected side in the central area RC as the NA increases. However, the spherical aberration SA is changed in the under corrected side in the vicinity of the boundary between the central area RC and the peripheral area RE, and then changes in the over corrected direction in the peripheral area as the NA increases. As a result, with this configuration, the occurrence of the spherical aberration in the peripheral area RE can be suppressed.

Fourth Embodiment

FIG. 11 shows a rear view of an objective lens 10 according to a fourth embodiment. In the fourth embodiment, the second surface 12 of the objective lens 10 is divided into the central area RC (0≦h<1.20) and the peripheral area RE (1.20≦h), and in the peripheral area RE, a diffraction lens structure which varies the spherical aberration depending on the wavelength of the light passing therethrough is formed. The first surface 11 of the objective lens 10 is a rotationally symmetrical aspherical surface without having a diffraction lens structure.

TABLE 5 indicates a numerical structure of the objective lens 10 according to the fourth embodiment.

TABLE 5

NA$_1$ = 0.60 f$_1$ = 3.00 λ$_1$ = 650 WD$_1$ = 1.61 OD$_1$ = ∞

| | | Second surface | |
|---|---|---|---|
| | First surface | Central area (0 ≦ h < 1.20) | Peripheral area (1.20 ≦ h) |
| r | 1.882 | −7.816 | −7.439 |
| κ | −0.500 | 0.000 | −0.500 |
| A$_4$ | −3.53 × 10$^{-4}$ | 1.66 × 10$^{-2}$ | 1.76 × 10$^{-2}$ |

TABLE 5-continued $NA_1 = 0.60$ $f_1 = 3.00$ $\lambda_1 = 650$ $WD_1 = 1.61$ $OD_1 = \infty$

|  | First surface | Second surface | |
|---|---|---|---|
|  |  | Central area ($0 \leq h < 1.20$) | Peripheral area ($1.20 \leq h$) |
| $A_6$ | $2.62 \times 10^{-5}$ | $-3.35 \times 10^{-4}$ | $-1.94 \times 10^{-3}$ |
| $A_8$ | $-1.04 \times 10^{-4}$ | $-1.18 \times 10^{-4}$ | $-2.73 \times 10^{-4}$ |
| $A_{10}$ | $3.05 \times 10^{-5}$ | $1.48 \times 10^{-4}$ | $1.50 \times 10^{-4}$ |
| $A_{12}$ | $-1.56 \times 10^{-5}$ | $-2.83 \times 10^{-5}$ | $-1.69 \times 10^{-5}$ |
| $P_2$ | — | — | 2.70 |
| $P_4$ | — | — | $-5.00 \times 10^{-1}$ |
| $P_6$ | — | — | $-1.23$ |
| $P_8$ | — | — | 0.00 |
| $P_{10}$ | — | — | 0.00 |
| $P_{12}$ | — | — | 0.00 |
| d (distance between first and second surfaces) |  |  | 1.80 |
| nd (refractive index of objective lens) |  |  | 1.5436 |
| vd (Abbe number of objective lens) |  |  | 55.7 |
| nd (refractive index of optical disc) |  |  | 1.5855 |
| vd (Abbe number of optical disc) |  |  | 29.9 |

FIG. 12A shows a spherical aberration SA and a sine condition SC of the objective lens according to the fourth embodiment, with respect to the first optical disc D1, at the wavelength of 650 nm. FIG. 12B shows chromatic aberrations represented by spherical aberrations at wavelengths of 650 nm, 645 nm and 655 nm.

FIGS. 13A and 13B show the aberrations similar to those shown in FIGS. 12A and 12B, respectively, when the refractive index of the resin forming the objective lens is lowered by 0.0044. When the temperature increases and thereby the refractive index decreases, the spherical aberration SA changes, as shown in FIG. 13A, on the over corrected side in the central area RC as the NA increases. However, the spherical aberration SA is changed in the under corrected side in the vicinity of the boundary between the central area RC and the peripheral area RE, and then changes in the under corrected direction in the peripheral area as the NA increases. As a result, with this configuration, the occurrence of the spherical aberration in the peripheral area RE can be suppressed.

TABLE 6 below indicates the variation of the wavefront aberration (rms, unit: λ) with respect to the temperature change ΔT degrees. In the table, the comparative objective lens is a lens which is not formed with the diffraction lens structure. FIG. 14 is a graph corresponding to TABLE 6.

TABLE 6

| ΔT (degrees) | wavefront aberration | | | | |
|---|---|---|---|---|---|
|  | 1st | 2nd | 3rd | 4th | comp. |
| 0 | 0.002 | 0.001 | 0.001 | 0.002 | 0.000 |
| 10 | 0.007 | 0.006 | 0.005 | 0.005 | 0.011 |
| 20 | 0.011 | 0.009 | 0.009 | 0.011 | 0.022 |
| 30 | 0.016 | 0.014 | 0.012 | 0.015 | 0.033 |
| 40 | 0.020 | 0.018 | 0.016 | 0.020 | 0.043 |

As indicated in TABLE 6 and shown in FIG. 14, by forming the diffraction lens structure in the peripheral area RE, the occurrence of the wavefront aberration due to the change of temperature is suppressed to less than the half. That is, by forming the diffraction lens structure for the temperature compensation only in the peripheral area RE, the occurrence of the wavefront aberration is suppressed. Further, an objective lens may be applicable to an optical head for a plurality of types of discs according to different standards, and the central area is commonly used for a plurality of types of discs.

If the diffraction lens structure for the temperature compensation is formed also in the central area RC, the wavefront aberration due to the temperature change can be well suppressed for the first optical disc D1 such as the DVD. However, such a lens has a relatively large wavelength dependence, and accordingly, cannot be used for another disc which requires a different working wavelength. On the contrary, if the diffraction lens structure for the temperature compensation is formed only in the peripheral area RE, although the peripheral area RE functions only for the first disc D1, the central area RC may function for another disc requiring a different working wavelength.

In particular, when a disc (which will be referred to as a second disc D2), whose data density is relatively low and whose protective layer is relatively thick and requires a laser beam having a relatively long wavelength for data recording/readout, such as a CD, is used, a portion of the laser beam passed through the peripheral area RE is diffused and does not contribute to form a beam spot, and only the portion of the beam passed through the central area RC contributes to form a beam spot. That is, a relatively small NA can be achieved for the second disc D2, and thus the beam spot formed on the data recording surface will not become to small, by forming the above-described diffraction lens structure in the peripheral area RE.

FIG. 15 schematically shows a structure of an optical system 100 for an optical head of an optical disc drive which can be used either the first disc D1 (DVD) or the second disc D2 (CD, CD-R). Any one of the objective lenses according to the above-described first to fourth embodiments can be used as the objective lens of the optical system 100 shown in FIG. 15. The optical system 100 includes a first laser module 21, a second laser module 22, a beam splitter 23, a collimating lens 24, and the objective lens 10.

Each of the laser modules 21 and 22 is a device provided with a laser diode and a photo sensor integrally.

The first optical disc D1 (e.g., the DVD) has a high data recording density and a relatively thin protective layer (0.6 mm). The second optical disc D2 (e.g., CD or CD-R) has a low data recording density and a relatively thick protective layer (1.20 mm).

The first laser module 21 is similar to the laser module 21 shown in FIG. 1, and includes a laser diode emitting a laser beam whose wavelength is 650 nm. In order to perform data recording/readout of the second disc D2, in particular the CD-R, due to its spectral reflectivity, an near infrared light beam should be used. Accordingly, the second laser module 22 has a laser diode which emits a laser beam whose wavelength is 780 nm.

When the first optical disc D1 (which is indicated by solid lines in FIG. 15) is used, the first laser module 21 is actuated. In this case, the objective lens 10 is arranged at a position indicated by solid lines in FIG. 15. The first laser beam (wavelength: 650 nm) emitted by the laser diode of the first laser module 21 is incident on the objective lens 10 as indicated by solid lines in FIG. 15, and converged by the objective lens 10 to form a beam spot on the data recording surface of the first optical disc D1.

When the second optical disc D2 (which is indicated by broken lines in FIG. 15) is used, the second laser module 22 is actuated. In this case, the objective lens 10 is located at a position indicated by broken lines in FIG. 15, which is closer to the optical disc than the position indicated by the solid line. The second laser beam (wavelength: 780 nm) emitted by the laser diode of the second laser module 22 is incident on the objective lens 10 as a diverging beam, which is converged by the objective lens 10 to form a beam spot on the data recording surface of the second optical disc D2.

The diffraction lens structure formed in the peripheral area RE suppresses the wavefront aberration due to the temperature change when the first laser beam is converged on the firsts disc D1, and provides the spherical aberration when the second laser beam is converged on the second disc D2. Therefore, when the first disc D1 is used, the portions of the laser beam passed through the central area RC and the peripheral area RE converge on the same position. Since the large NA is achieved, a sufficiently small beam spot can be formed on the first disc D1. Further, the light converging performance of the objective lens is affected little by the temperature change.

When the second disc D2 is used, the portion of the laser beam passed through the peripheral area RE is diffused, and only the portion of the laser beam passed through the central area RC contributes to the formation of the beam spot. Thus, a relatively small NA is achieved, and the size of the beam spot formed on the second disc D2 is greater than that of the spot formed on the first disc D1. It should be noted that, since the NA is relatively small when the second disc D2 is used, the change of the wavefront variation due to the temperature change affects little.

When the objective lenses according to the first through fourth embodiments are to be applied to the optical system shown in FIG. 15, it is preferable that the laser beam (wavelength: 780 nm) emitted by the second laser module 22 is incident on the objective lens 10 as a diverging beam so that the object distance is −52.0 mm. With this configuration, an optimum beam spot can be formed on the data recording surface of the second disc D2.

The present disclosure relates to the subject matter contained in Japanese Patent Application No. 2000-312110, filed on Oct. 12, 2000, which is expressly incorporated herein by reference in its entirety.

What is claimed is:

1. A single element objective lens for an optical disc drive, said objective lens converging a laser beam emitted by a laser source on a data recording surface of an optical disc through a protective layer of the optical disc,
   wherein one surface of said objective lens is divided into a central area including an optical axis of said objective lens and a peripheral area surrounding said central area, an area of said peripheral area being not greater than an area of said central area, said central area being formed as a continuous surface having no stepped portions, said peripheral area is provided with a diffraction lens structure formed by a plurality of concentric annular zones including minute steps, said diffraction lens structure being configured to compensate for variation of a converging characteristic of said objective lens due to a change of a temperature.

2. The objective lens according to claim 1, wherein said diffraction lens structure is configured to have a characteristic such that the spherical aberration changes in an under corrected direction when a wavelength of the laser beam incident on said objective lens increases.

3. The objective lens according to claim 1, wherein said objective lens is a plastic lens with a refractive index that decreases when the temperature increases, a wavelength of the laser beam increasing when the temperature increases.

4. A single element objective lens for an optical disc drive, said objective lens converging a laser beam emitted by a laser source on a data recording surface of an optical disc through a protective layer of the optical disc,
   wherein one surface of said objective lens is divided into a central area including an optical axis of said objective lens and a peripheral area surrounding said central area, an area of said peripheral area being not greater than an area of said central area, a diffraction lens structure formed by a plurality of concentric annular zones including minute steps being formed only in said peripheral area, said diffraction lens structure being configured to compensate for variation of a converging characteristic of said objective lens due to a change of a temperature.

5. The objective lens according to claim 4, wherein said objective lens is a plastic lens with a refractive index that decreases when the temperature increases, a wavelength of the laser beam increasing when the temperature increases.

6. An optical system of an optical head for an optical disc drive, comprising:
   a laser source unit that emits a laser beam; and
   a single element objective lens that converges a laser beam emitted by said laser source unit on a data recording surface of an optical disc through a protective layer of the optical disc,
   wherein one surface of said objective lens is divided into a central area including an optical axis of said objective lens and a peripheral area surrounding said central area, an area of said peripheral area being not greater than an area of said central area, said peripheral area being provided with a diffraction lens structure formed by a plurality of concentric annular zones including minute steps, said diffraction lens structure being configured to compensate for variation of a converging characteristic of said objective lens due to a change of a temperature.

7. The optical system according to claim 6, wherein said central area is a continuous surface having no stepped portions.

8. The optical system according to claim 6, wherein said laser source unit selectively emits one of a first laser beam and a second laser beam, a wavelength of said second laser beam being longer than a wavelength of said first laser beam, said second laser beam being incident on said objective lens as a diverging beam, said first laser beam being incident on said objective lens as a beam having less divergence than said second laser beam, said objective lens converging the first laser beam on a data recording surface of a first optical disc through a first protective layer of the first optical disc, said objective lens converging the second laser beam on a data recording surface of a second optical disc through a second protective layer of the second optical disc, a data density of the first optical disc being higher than a data density of the second optical disc, a thickness of the first protective layer being smaller than a thickness of the second protective layer.

9. The optical system according to claim 6, wherein a wavelength of the laser beam emitted by said laser source unit increases when the temperature increases, and wherein said objective lens is plastic, with a refractive index that decreases as the temperature increases.

10. The optical system according to claim 6, wherein said diffraction lens structure has a characteristic such that the spherical aberration of said objective lens changes in an under corrected direction when a wavelength of the laser beam incident on said objective lens increases.

11. An optical system of an optical head for an optical disc drive, comprising:
   a laser source unit that emits a laser beam; and
   a single element objective lens that converges a laser beam emitted by said laser source unit on a data recording surface of an optical disc through a protective layer of the optical disc, one surface of said objective lens being divided into a central area including an optical axis of said objective lens and a peripheral area surrounding said central area, said peripheral area being provided with a diffraction lens structure formed by a plurality of concentric annular zones including minute steps, said diffraction lens structure being configured to compensate for variation of a converging characteristic of said objective lens due to a change of a temperature;

wherein said laser source unit selectively emits one of a first laser beam and a second laser beam, a wavelength of said second laser beam being longer than a wavelength of said first laser beam, said second laser beam being incident on said objective lens as a diverging beam, said first laser beam being incident on said objective lens as a beam having less divergence than said second laser beam, said objective lens converging the first laser beam on a data recording surface of a first optical disc through a first protective layer of the first optical disc, said objective lens converging the second laser beam on a data recording surface of a second optical disc through a second protective layer of the second optical disc, a data density of the first optical disc being higher than a data density of the second optical disc, a thickness of the first protective layer being smaller than a thickness of the second protective layer.

12. The optical system according to claim 11, wherein said central area is a continuous surface having no stepped portions.

13. The optical system according to claim 11, wherein a wavelength of the laser beam emitted by said laser source unit increases when the temperature increases, and wherein said objective lens is plastic, with a refractive index that decreases as the temperature increases.

14. The optical system according to claim 11, wherein said diffraction lens structure has a characteristic such that the spherical aberration of said objective lens changes in an under corrected direction when a wavelength of the laser beam incident on said objective lens increases.

* * * * *